Jan. 9, 1968     M. SKOLNICK     3,362,304
AUTOMATIC BOOKLET COUNTING CONTROL SYSTEM
Filed Sept. 2, 1965     4 Sheets-Sheet 4
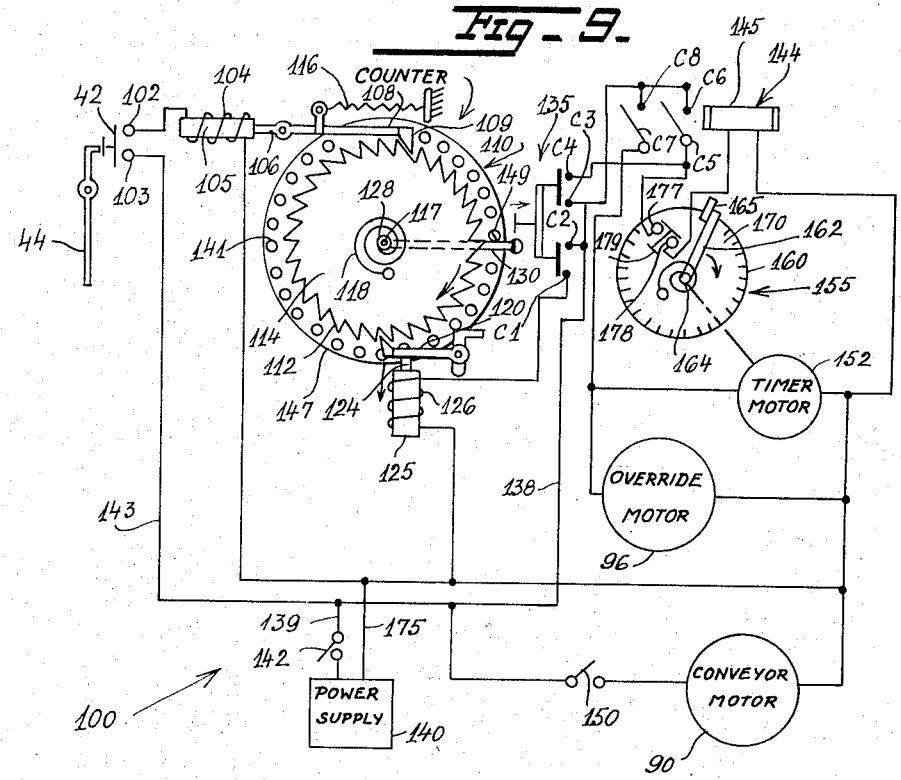
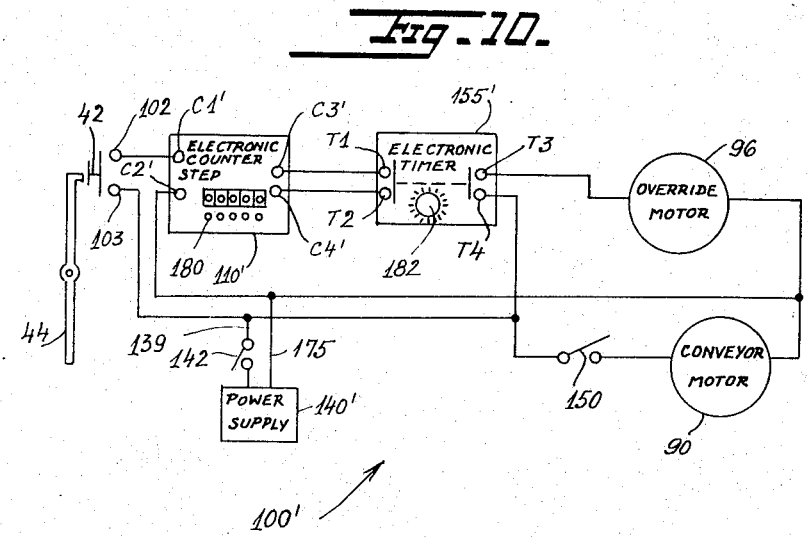
INVENTOR
Max Skolnick
BY Polachek & Saulsbury
ATTORNEYS

United States Patent Office 3,362,304
Patented Jan. 9, 1968

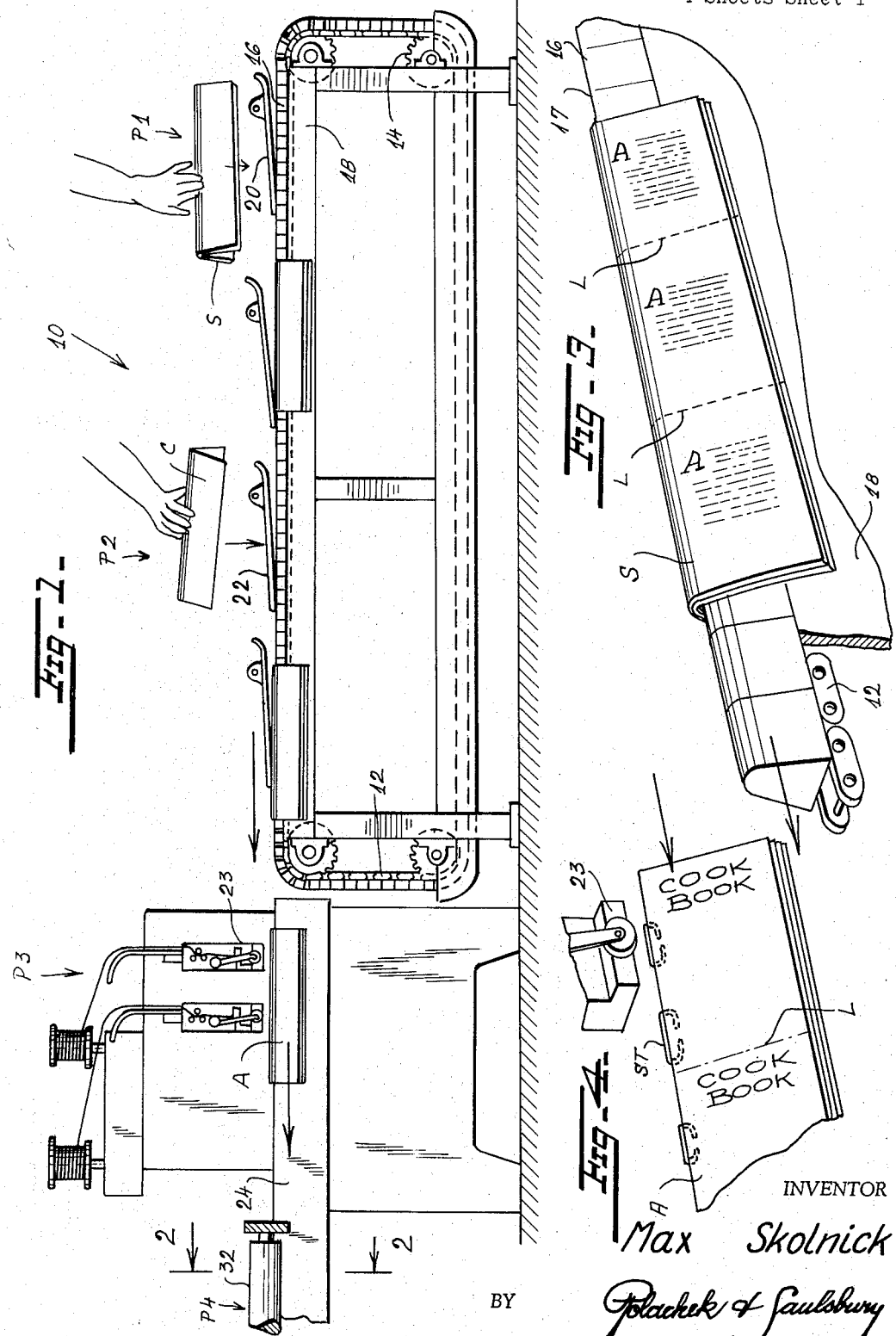

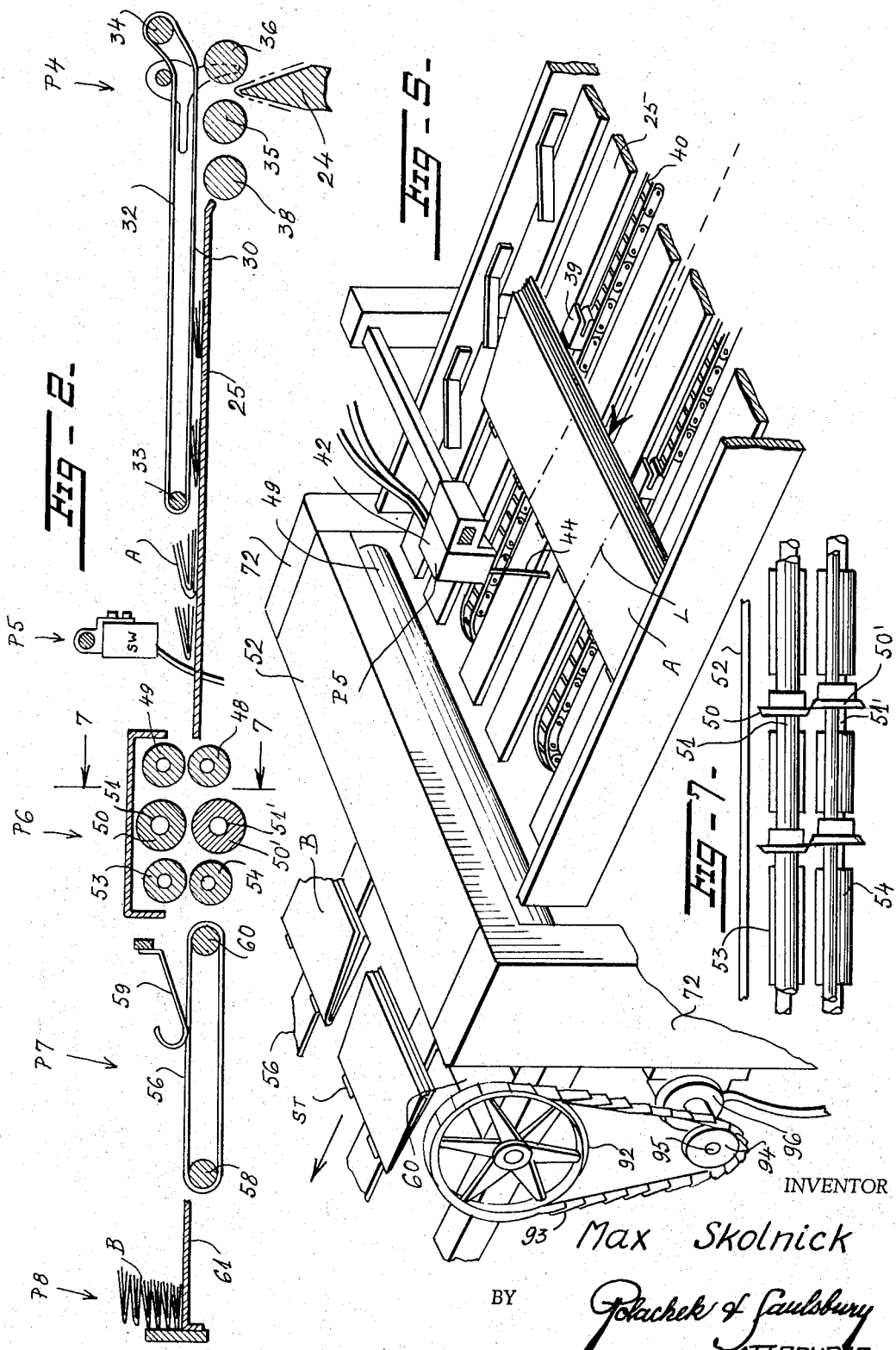

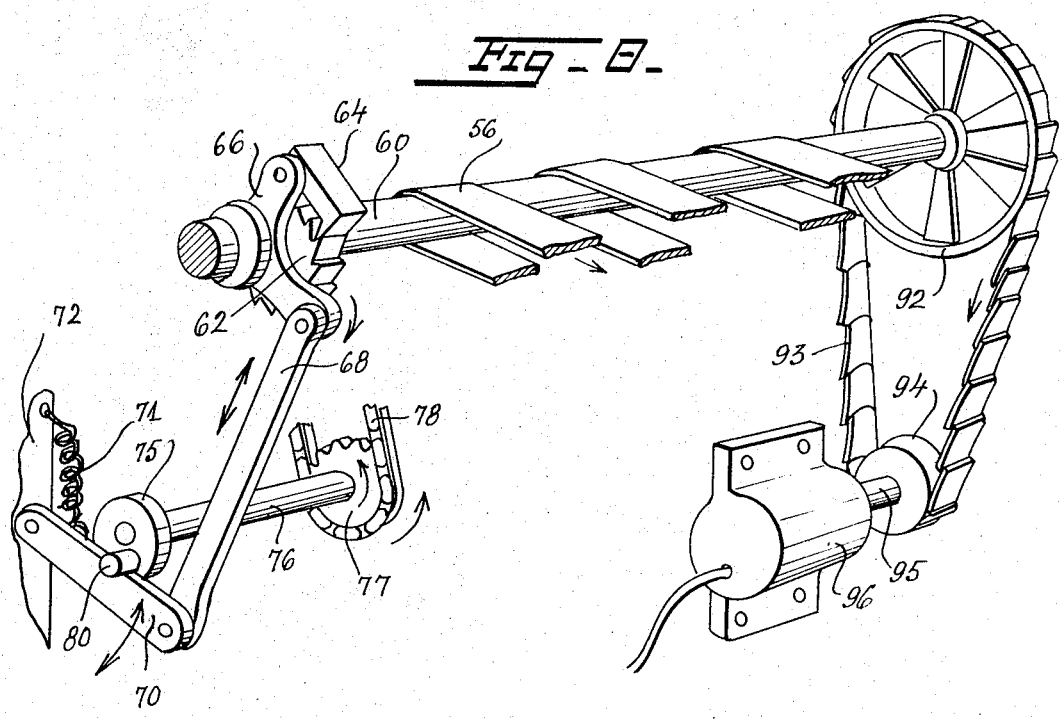
Fig_8_
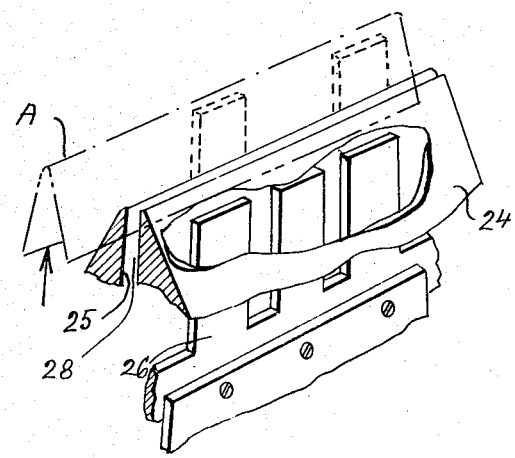
Fig_6_

3,362,304
AUTOMATIC BOOKLET COUNTING
CONTROL SYSTEM
Max Skolnick, Forest Hills, N.Y., assignor to Norton
Spiel Associates, Inc., New York, N.Y., a corporation of New York
Filed Sept. 2, 1965, Ser. No. 484,560
15 Claims. (Cl. 93—93)

This invention concerns an automatic booklet counting and conveyor drive control system.

Heretofore in book binderies it has been customary to count by hand booklets or pamphlets as they come off of conveyors in binding machines. Manual counting often results in errors, in that too few or too many booklets are gathered in stacks for packing and shipment.

To minimize errors it has been heretofore necessary to slow down the conveyors, which lowers the hourly output of the machines. Alternatively it has been necessary to employ more operators at the conveyors to count the booklets. This is costly in time and labor and does not wholly eliminate errors. The present invention is directed at overcoming the difficulties and disadvantages above mentioned by providing a system including automatic counting means at a booklet conveyor. This system operates in conjunction with the conveyor to separate each counted group of booklets from succeeding booklets on the conveyor. The system operates automatically without slowing down operations at stitching, cutting and other operating positions of the binding machinery.

It is one object of the invention to provide a booklet binding machine with a counting and control system including a predetermined booklet counter, a delay timer and an over-ride motor all electrically interconnected and including drive means driven by the motor for advancing a conveyor attached to a binding machine at a speed faster than the normal speed of the conveyor.

Another object is to provide a counting and control system as described, with means for adjusting the counter for counting selected numbers of booklets in each group and with means for adjusting the timer to advance the conveyor to attain a higher speed than normal speed of conveyor for different selected lengths of time.

Still another object is to provide a counting and control system as described wherein the override drive means is arranged to cooperate with a ratchet driven shaft in the conveyor.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a diagrammatic, front view of a part of a binding machine in which the invention is incorporated.

FIG. 2 is a fragmentary sectional view taken on line 2—2 of FIG. 1.

FIG. 3 is an enlarged fragmentary sectional view of a conveyor employed in the machine of FIG. 1.

FIG. 4 is an enlarged fragmentary sectional view of a booklet at a stapling position in the machine.

FIG. 5 is a fragmentary perspective view of part of the binding machine of FIG. 1 in which the system embodying the invention is incorporated.

FIG. 6 is a perspective view of part of the booklet conveying means in the machine of FIG. 1.

FIG. 7 is a fragmentary sectional view taken on line 7—7 of FIG. 2, at a cutting position in the machine.

FIG. 8 is an enlarged fragmentary perspective end view of the override drive means according to the invention, shown with part of one form of conveyor drive means.

FIG. 9 is a diagram of the basic electric circuit employed in the counting and control system embodying the invention.

FIG. 10 is a diagram of another electric circuit which can be employed in the system.

Referring first to FIGS. 1, 2 and 5, there is shown a binding machine assembly 10 including a conveyor chain 12 carried on sprockets 14 in an endless rectangular vertical array. Attached to links of the chain are tapered blocks 16 which are juxtaposed end to end to define a long rail 17 at the upper horizontal course of the chain. The rollers are rotatably supported on a stand 18. At the rear or right end of the upper horizontal course of the chain as viewed in FIG. 1 is sheet loading position P1 where a pile of folded sheets S are manually loaded upon the rail 17; see also FIG. 3. The pile of sheets passes under a pivotable guide 20 to cover-applying position P2 where a cover C is applied on top of each pile of sheets S. The covered piles of sheets then pass under pivotable guide 22 off rail 17 at its forward or left end on to a plate 24.

At the rear or right end of plate 24 as viewed in FIG. 1 is stapling position P3 where staples ST are applied by staplers 23 at the center fold of each covered pile of sheets. This forms a multiple booklet assembly A since the sheet S and cover C are double or triple in length of a booklet to be cut apart from the stapled assembly. Plate 24 is stationary and the stapled assemblies are moved away from stapling position P3 to loading position P4 where the stapled assemblies are removed from the plate 24 and passed one at a time over horizontal platform plates 25; see FIGS. 2 and 5.

Platform plates 25 extend in a horizontal plane perpendicular to plate 24. The stapled assemblies A are raised by vertically moving tucker blade 26 shown in FIG. 6. This tucker blade 26 is raised and lowered cyclically by a means operated by a camshaft in the rear of the machine transmitting intermittently the vertical motion which pushes the booklet up onto horizontal platform plates 25. The tucker blade 26 extends upwardly through a slot 28 in the end of plate 24.

When the stapled assemblies are raised, they are engaged by the lower horizontal course 30 of an endless belt 32 which is entrained on rollers 33, 34. The assemblies A pass upward between guide rollers 35, 36 and over idler roller 38 to platform plates 25. Just beyond the roller 33 and belt 32 each stapled assembly A is pushed at the trailing edge by a clip block 39 carried by chains 40 disposed between platform plates 25; see FIGS. 2 and 5.

At counting position P5 is a counting switch 42 having an operating, pivotable arm 44 which is deflected from a vertical position each time a stapled booklet assembly A passes the counting position P5. The stapled assembly A then passes between drive pressure control rollers 48, 49 to slitter knives 50, 50' which slit assemblies into individual booklets shown at cutting position P6 in FIGS. 2, 5 and 7. The knives 50, 50' are carried by shaft 51, 51' disposed under a protective cover 52. The slitter knives 50, 50' cut the assembly A into a plurality of booklets B. Each assembly is cut along the transverse dot and dash lines L indicated in FIGS. 3 and 5.

The booklets B pass away from cutting position P6 through drive pressure control rollers 53, 54 onto horizontal conveyor belts 56 under spring holddown guide 59. The belts 56 are carried on rollers 58, 60 at longitudinal stacking position P7. The booklets B pass off the belts 56 at their forward or right ends as viewed in FIGS. 2 and 5 onto a table 61 at vertical stacking position P8 where the booklets B are manually stacked for packing and shipment.

Roller shaft 60 is driven in a step-by-step fashion by drive means best shown in FIG. 8. On roller shaft 60 is a ratchet wheel 62. A pawl 64 is pivotally mounted on a bell crank lever 66 carried by roller shaft 60. The lever is free to tilt independently of the rotation of roller shaft 60. Attached to lever 66 is a link 68 attached in turn to a cam follower arm 70. This arm is pivoted on a stationary frame 72 of the machine. Rotating cam 75 is mounted on a continuously rotating shaft 76 having a drive sprocket 77 engaged by drive chain 78. The cam has a laterally extending eccentrically located pin 80 which periodically engages arm 70 to depress this arm. When arm 70 is depressed it lowers link 68 which tilts the lever 66 so that pawl 64 advances the ratchet wheel and rollershaft 60 angularly one step. Arm 70 is raised by return spring 71 secured to frame 72. Chain 78 is driven by a conveyor motor 90 shown in circuit 100 of FIG. 9. This motor is arranged in a suitable mechanical system (not shown) to drive the chains 12, 40, 78, belt 32, rollers 48, 49, 53, 54 and shafts 51, 51' in coordination with each other.

The machine 10 is provided with an override drive means of belts 56 and rollers 58, 60. This drive means as shown in FIGS. 5 and 8 includes a large pulley 92 mounted on the other end of roller shaft 60. Entrained on this pulley is a belt 93 engaged on a drive pulley 94. Pulley 94 is mounted on drive shaft 95 of a motor 96. Motor 96 is mounted on the frame 72 of the machine.

Motor 96 along with switch 42 are connected in counting and control circuit 100 shown in FIG. 9 to which reference is now made. Switch 42 has normally open contacts 102 and 103 which are closed when arm 44 of the switch is pivoted laterally by a passing book assembly A. Contact 102 is connected to coil 104 of a solenoid 105 in a step counter 110. Solenoid 105 has a plunger 106 carrying a pivoted bar 108 with a ratchet tooth 109 at its free end. The tooth 109 slides over teeth 112 of ratchet wheel 114 when the solenoid is energized. A return spring 116 which is tensioned when the plunger 106 is retracted contracts to turn ratchet wheel 114 one step as tooth 109 engages with one of the ratchet teeth.

Ratchet wheel 114 rotates freely on a shaft 117. A coil spring 118 connected between the shaft and wheel is tensioned when the wheel is rotated from its starting position shown in FIG. 9. A latch arm 120 is engaged with a bottom tooth of the ratchet wheel. This arm is retracted by a plunger 124 of a solenoid 125 when coil 126 is energized. Then the ratchet wheel rotates freely as tension in spring 118 is released to a stop or zero position of the wheel. The wheel has a sleeve 128 on which is mounted a laterally extending arm 130. This arm can be manually moved around wheel 114 to any desired position on wheel 114 and will remain there to rotate with wheel 114.

Wheel 114 rotates adjacent to a stationary disk 147. This disk has a series of circumferentially spaced holes 141 into any one of which a stop pin 149 can be inserted to stop free rotation of the wheel 114 and arm 130 in a counterlockwise direction. During normal operation wheel 114 rotates with arm 130 until the tip of arm 130 closes stationary switch 135 and then the wheel and arm return to zero or starting position.

Switch 135 is a pushbutton tyye of microswitch with two sets of contacts C1, C2, and C3, C4. Contact C1 is connected to coil 126 of solenoid 125. Contacts C2 and C3 are connected via wire 138 to power supply wire 139. An ON-OFF switch 142 is connected in series with wire 139. Wire 139 is also connected to conveyor motor 90 via an ON-OFF switch 150. Contact C4 is connected to movable contact C5 of a relay 144.

Relay 144 has movable contacts C5, C7 and fixed contacts C6, C8. Contacts C6 and C8 are connected together to contacts C2, C3 and wire 138. Contact C7 is connected to terminals of timer motor 152 and override motor 96.

The timer 155 includes a stationary timer disk 160 on which is a rotatable arm 162 carried by a shaft 164 driven by motor 152. A stop member 165 can be positioned anywhere along the periphery of the disk 160 to serve as the starting position for the arm 162. A coil spring 170 is connected between shaft 164 and the disk to return the shaft and arm to starting position when the timer motor 152 is deenergized. Power wire 175 is connected to the motors 90, 96 and 152, to coil 104 of the solenoid 105, to coil 126 of solenoid 125, and to coil 145 of relay 144.

On timer disk 160 are two spaced contacts 177, 178 of a switch 179. The switch is normally closed but is opened when arm 162 of the timer comes around clockwise to the switch. The switch 179 is circumferentially spaced from stop member 165. Contact 177 is connected to relay contact C5 and contact 178 is connected to one end of relay coil 145.

In operation of the system illustrated by circuit 100, in cooperation with the conveyor apparatus of machine assembly 10, conveyor motor 90 will operate continuously and will drive the roller shaft 60 in stepwise fashion as pawl 64 advances ratchet wheel 62 a step at a time. Switches 142 and 150 will be closed so that motor 90 is continuously energized.

The stop member 165 of the timer is set anywhere on disk 160 where arm 165 will reach contacts 177, 178 in a predetermined time such as one, two or more seconds. The arm 130 is set so that it will reach switch 135 in any predetermined number of steps or counts of wheel 114, such as ten, twenty, or more. Arm 44 will be deflected as each booklet assembly A passes this arm. Each time the arm is deflected the circuit coil 104 is closed and solenoid 105 is energized to retract plunger 106. As the booklet assembly passes arm 44, switch 42 opens, solenoid 105 is deenergized and spring 116 retracts arm 108 to advance the wheel 114 one step. When arm 130 comes around to switch 135 it closes this switch.

When switch 135 is closed, contacts C1, C2 are bridged and the coil 126 of the solenoid energized. This retracts the latch arm 120 and the wheel 114 is released so that the wheel 114 and arm 130 return to starting position at pin 149 to begin another counting cycle. There is sufficient inertia in the movement of arm 120 so that arm 130 will return to its starting position before the latch arm 120 reengages the wheel 114. As arm 130 leaves switch 135 the switch opens; the latching solenoid 125 becomes deenergized.

Contacts C3, C4 also close when contacts C1, C2 close. This closes the circuit of instant acting relay coil 145 through closed contacts 177, 178. The coil becomes energized and closes contacts C5, C6 and C7, C8. When contacts C5, C6 close they complete a holding circuit for coil 145 so that this coil remains energized even though contacts C3, C4 immediately thereafter open. When contacts C7, C8 close they complete the power supply circuits for timer motor 152 and override motor 96. Motor 96 then drives roller shaft 60 rapidly so that the belts 56 advances rapidly rather than stepwise. The booklets B which are on the belts are moved forwardly rapidly and are spaced from the next booklets which are deposited on the belts from the cutting positions P6. An operator standing at position P7 will gather up the forwardly located booklets and pile them into a vertical stack on table 61. The rapid movement of the belts signals the end of the preset booklet count for which the system is arranged.

At the same time that motor 96 is started, the timer motor starts rotating arm 162. Afer one or more seconds the arm reaches contacts 177, 178, the arm reaches switch 179 and opens contacts 177, 178. This causes the relay coil 145 to become deenergized. Contacts C5, C6 and C7, C8 open and both the timer motor and override motor stop.

During the timed period while the override motor is running, particularly toward the end of the timed cycle, one or more groups of booklets may pass arm 44. These booklets will be counted so that there is no possibility of an overcount of booklets passing arm 44 before the beginning of the next times drives of motor 96.

The apparatus is then ready for another cycle of counting, belt advance, timing, and motor control. The drive of belts 56 by motor 96 overrides the continued operation of the stepwise conveyor drive via chain 78, cam 75, lever 66 and pawl 64.

By the arrangement described any desired quantity of booklets are automatically counted and physically separated from succeeding blooklets. There is no possibility of introduction of human error into the counting since the operator needs only remove those few booklets from belts 56 which remain thereon after the belts begin rapid steady forward movement to complete the predetermined count.

In place of the mechanical counter 110 shown in FIG. 9 it is possible to substitute an electronically operated counter 110′ and an electronic timer 155′ shown in circuit 100′ of FIG. 10 to which reference is now made.

Parts of circuit 100′ corresponding to those of circuit 100 are identically numbered. In circuit 100′ contacts 102, 103 of switch 42 are connected to step terminal C1′ and power supply wire 139. Power supply wire 175 is connected to step contact C2′. The power supply circuit for stepping the counter is closed when switch 42 is closed by pivoting of arm 44. The counter has normally open terminals C3′, C4′ at which an output pulse appears at the end of predetermined number of counts. The counter has a plurality of cycle setting buttons 180 any of one of which can be selectively closed for setting the counter to perform a desired count. After this count is completed, the counter is ready at once to begin another count. A pulse appears at terminals C3′, C4′ at the end of each counting cycle.

An electronic timer 155′ has input terminals T1, T2 connected to terminals (counter) C3′, C4′. When a pulse is applied at terminals T1, T2, output terminals T3, T4 are closed and remain closed for the duration of a timing cycle determined by the setting of dial 182. At the end of the timing cycle terminals T3, T4 open. Terminals T3, T4 are connected in series with the override motor 98 and the power supply 140′ so that the override motor is driven only during the timed cycle. If one or more groups of booklets should pass arm 44 during the timing cycle when the motor 96 is being driven, these booklets will be counted. The new timing cycle for driving motor 96 will begin when the counter 110′ completes its counting cycle.

It will be noted that in both circuits 100 and 100′, the beginning of the timing cycle is dependent on completion of the prescribed count, but the counting is not dependent on the completion of the timing cycle, thus the counter is always activated and at all times ready to count any booklets which may pass the counting arm 44.

Either counting and control circuit 100 or 100′ may be installed in the binding machine assembly 10. It will be understood that different types of conveyor step drives can be used than that illustrated. In any case the override mechanism will advance the conveyor means for the counted booklets rapidly for a predetermined time and distance while the remainder of the machine keeps operating continuously at all operating positions P1–P6 without interruption.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. An automatic booklet counting and conveyor drive control system comprising booklet conveyor means, a shaft driving said conveyor means, a first motor driving said shaft, ratchet means operatively interconnecting said motor and shaft so that said conveyor means moves in stepwise fashion, an override motor, means operatively connecting said override motor to said shaft to drive the same continuously so that said ratchet means is overridden, power supply means connected to the override motor for energizing the same, a counter for said booklets, normally open switch means for keeping said circuit open and said override motor deenergized, switch activation means in said counter for closing said switch means after a predetermined number of booklets are counted by the counter to start said override motor, and a timer connected in circuit with said switch means and arranged to start a timing cycle when said switch means closes, said timer having reset means arranged to stop both the timer and the override motor at the end of said timing cycle, so that counted booklets on said conveyor means are physically separated from succeeding booklets arriving at said conveyor means, and whereby said counter counts any of said succeeding booklets arriving at the counter before the end of said timing cycle.

2. An automatic booklet counting and conveyor drive control system, comprising booklet conveyor means, step drive means for advancing the conveyor means in stepwise fashion, an override motor, means operatively connecting said override motor to said conveyor means for driving the same continuously and overriding said step drive means, power supply means connected to the override motor for energizing the same, a counter for said booklets, normally open switch means in circuit with said override motor and power supply means for keeping said circuit open and said override motor deenergized, switch activation means in said counter for closing said switch means after a predetermined number of booklets are counted by the counter to start said override motor, and a timer connected in circuit with said switch means and arranged to start a timing cycle when said switch means closes, said timer having reset means arranged to stop both the timer and the override motor at the end of said timing cycle, so that counted booklets on said conveyor means are physically separated from succeeding booklets arriving at said conveyor means, and whereby said counter counts any of said succeeding booklets arriving at the counter before the end of said timing cycle.

3. An automatic booklet counting and conveyor drive control system according to claim 1, said counter including adjustment means for setting said switch actuation means to close said switch means after any one of a multiplicity of different predetermined counts.

4. An automatic booklet counting and conveyor drive control system according to claim 3, said timer including adjustment means for setting said reset means to terminate said timing cycle after any selected time duration.

5. An automatic booklet counting and conveyor drive control system having booklet conveyor means and step drive means for advancing said conveyor means in stepwise fashion, said system comprising an override motor, means for operatively connecting said override motor to said conveyor means for driving the same continuously and overriding said step drive means, power supply means connected to the override motor for energizing the same, a counter for said booklets, normally open switch means in circuit with said override motor and power supply means for keeping said circuit open and said override motor deenergized, switch activation means in said counter for closing said switch means after a predetermined number of booklets are counted by the counter to start said override motor, and a timer connected in circuit with said switch means and arranged to start a timing cycle when said switch means closes, said timer having reset means arranged to stop both the timer and the override motor at the end of said timing cycle, so that counted booklets on said conveyor means are physically separated from succeeding booklets arriving at said conveyor means, and whereby said counter counts any of said succeeding booklets arriving at the counter before the end of said timing cycle.

6. An automatic booklet counting and conveyor drive control system according to claim 5, said counter including adjustment means for setting said switch actuation means to close said switch means after any one of the multiplicity of different predetermined counts.

7. An automatic booklet counting and conveyor drive control system according to claim 6, said timer including adjustment means for setting said reset means to terminate said timing cycle after any selected timed duration.

8. An automatic booklet counting and conveyor drive control system according to claim 1, said counter including a rotatable ratchet wheel, solenoid means for advancing said wheel, an arm pivotable by booklets passing said arm, and another switch actuated by said arm and connected in circuit with said solenoid whereby said ratchet wheel is advanced one step each time said arm is pivoted.

9. An automatic booklet counting and conveyor drive control system according to claim 8, said switch actuation means including a second arm carried by said ratchet wheel and disposed to close said switch means at a certain point in the rotation of the arm and wheel at the end of a predetermined number of advancing steps of said ratchet wheel.

10. An automatic booklet counting and conveyor drive control system according to claim 9, said timer including a stationary disk, and a third arm rotated in said timer, said third arm being disposed to actuate said reset means at the end of said timing cycle.

11. An automatic booklet counting and control system according to claim 10, further comprising a solenoid operated latching means engaged with said ratchet wheel in the counter and arranged to release said wheel for resetting the same to start a new count, said solenoid means being connected in circuit with said switch means whereby said counter is reset to start a new count immediately upon actuation of said switch means at the start of said timing cycle.

12. An automatic booklet counting and control system according to claim 11, a timer motor operatively arranged to drive said third arm and connected in circuit with said switch means for starting said timing cycle when said switch means is closed.

13. An automatic booklet counting and control system according to claim 2, said counter including a rotatable ratchet wheel, solenoid means for advancing said wheel, an arm pivotable by booklets passing said arm, and another switch actuated by said arm and connected in circuit with said solenoid whereby said ratchet wheel is advanced one step each time said arm is pivoted, said switch actuation means including a second arm carried by said ratchet wheel and disposed to close said switch means at a certain point in the rotation of the arm and wheel at the end of a predetermined number of advancing steps of said ratchet wheel, said timer including a stationary disk, and a third arm rotated in said timer, said third arm being disposed to actuate said reset means at the end of said timing cycle, a solenoid operated latching means engaged with said ratchet wheel in the counter and arranged to release said wheel for resetting the same to start a new count, said solenoid means being connected in circuit with said switch means whereby said counter is reset to start a new count immediately upon actuation of said switch means at the start of said timing cycle, a timer motor operatively arranged to drive said third arm and connected in circuit with said switch means for starting said timing cycle when said switch means is closed.

14. An automatic booklet counting and control system according to claim 5, said counter including a rotatable ratchet wheel, solenoid means for advancing said wheel, an arm pivotable by booklets passing said arm, and another switch actuated by said arm and connected in circuit with said solenoid whereby said ratchet wheel is advanced one step each time said arm is pivoted, said switch actuation means including a second arm carried by said ratchet wheel and disposed to close said switch means at a certain point in the rotation of the arm and wheel at the end of a predetermined number of advancing steps of said ratchet wheel, said timer including a stationary disk, and a third arm rotated in said timer, said third arm being disposed to actuate said reset means at the end of said timing cycle, a solenoid operated latching means engaged with said ratchet wheel in the counter and arranged to release said wheel for resetting the same to start a new count, said solenoid means being connected in circuit with said switch means whereby said counter is reset to start a new count immediately upon actuation of said switch means at the start of said timing cycle, a timer motor operatively arranged to drive said third arm and connected in circuit with said switch means for starting said timing cycle when said switch means is closed.

15. An automatic booklet counting and control system according to claim 14 wherein said switch means includes a relay connected in circuit with said reset means, said relay having a holding circuit for keeping the relay energized and both the timer motor and override motor energized until said reset means operates to deenergize the relay and open the power supply circuit of the timer motor and override motor.

References Cited
UNITED STATES PATENTS 3,027,817  4/1962  Loeffler _____ 93—93

FOREIGN PATENTS 690,868  4/1953  Great Britain.

BERNARD STICKNEY, *Primary Examiner.*